June 19, 1956          B. CHÂTEL          2,750,611
AUTOMATIC MEAL TABLE
Filed April 29, 1952          7 Sheets-Sheet 1
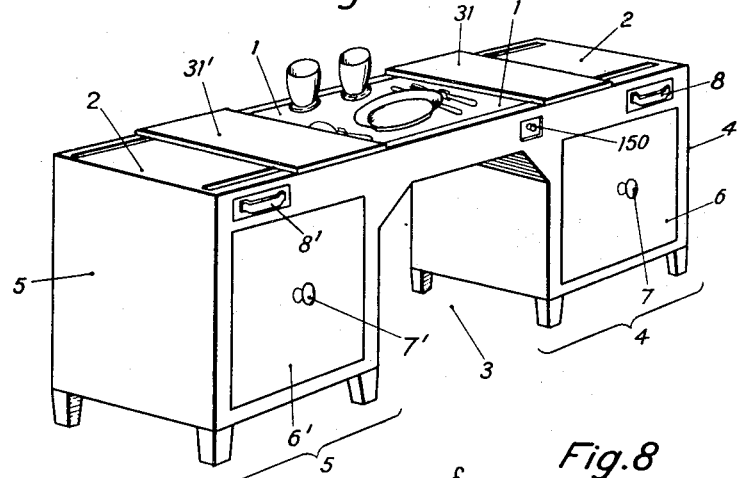
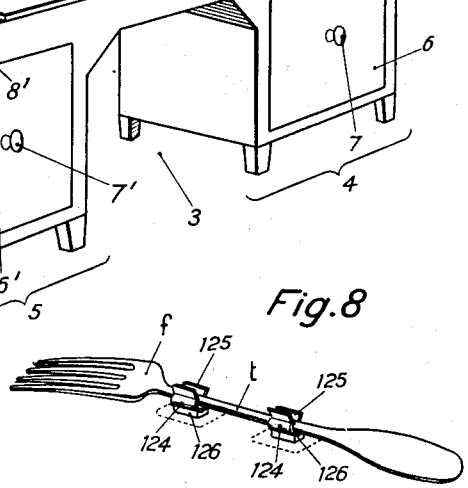
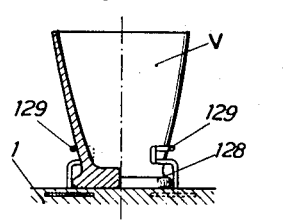
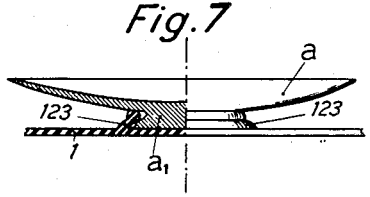
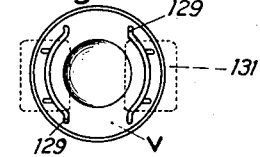
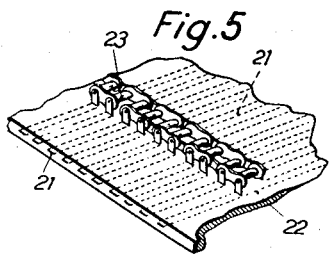
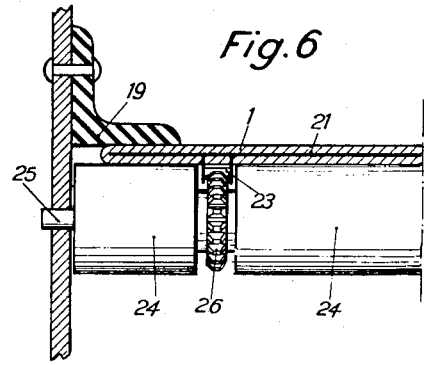
INVENTOR
BERTRAND CHÂTEL
By Linton and Linton
ATTORNEYS

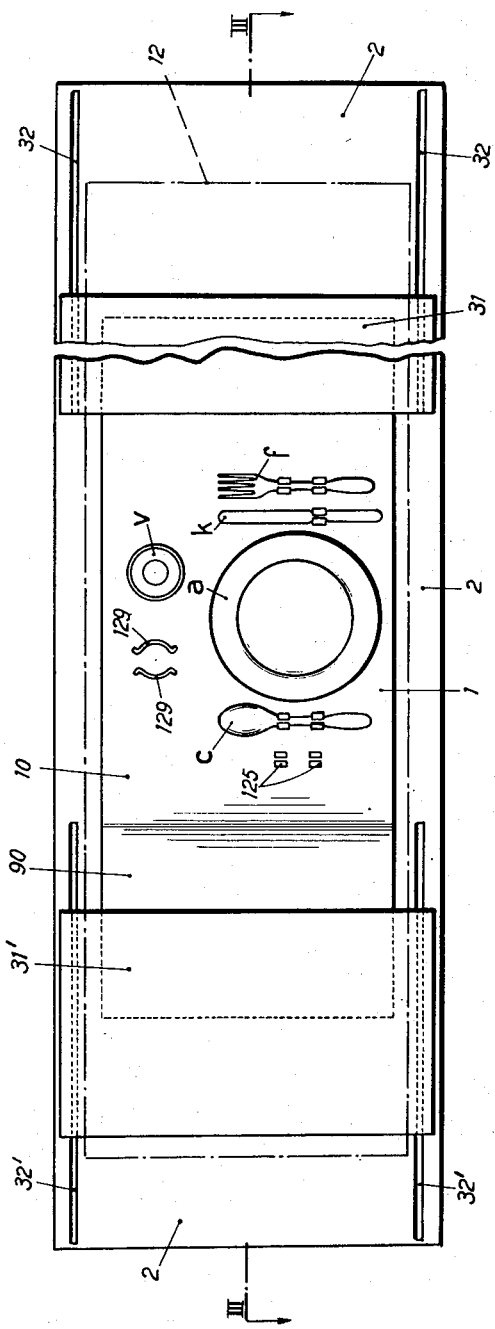

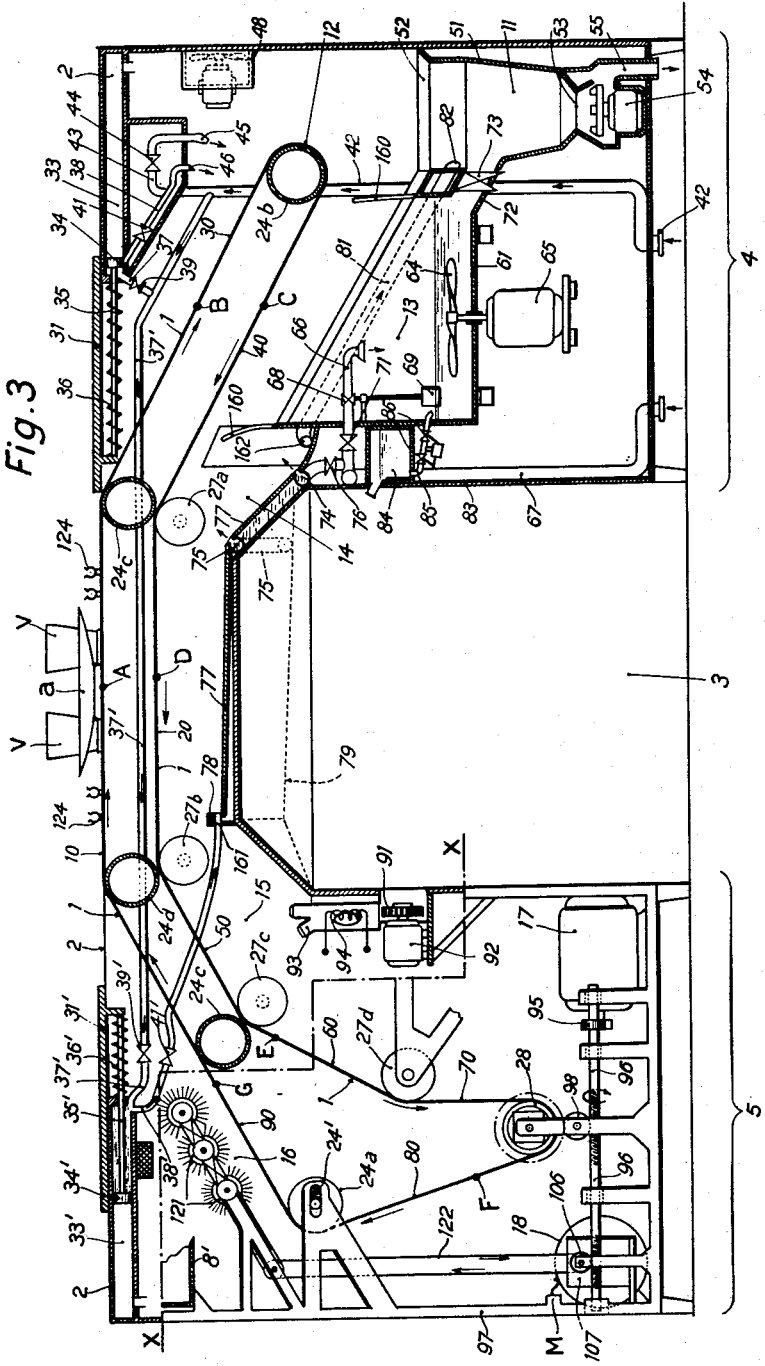

June 19, 1956  B. CHÂTEL  2,750,611
AUTOMATIC MEAL TABLE
Filed April 29, 1952  7 Sheets-Sheet 4

INVENTOR
BERTRAND CHÂTEL
By Linton and Linton
ATTORNEYS

June 19, 1956   B. CHÂTEL   2,750,611
AUTOMATIC MEAL TABLE
Filed April 29, 1952   7 Sheets-Sheet 5

INVENTOR
BERTRAND CHÂTEL
By Linton and Linton
ATTORNEYS

June 19, 1956  B. CHÂTEL  2,750,611
AUTOMATIC MEAL TABLE
Filed April 29, 1952  7 Sheets-Sheet 6
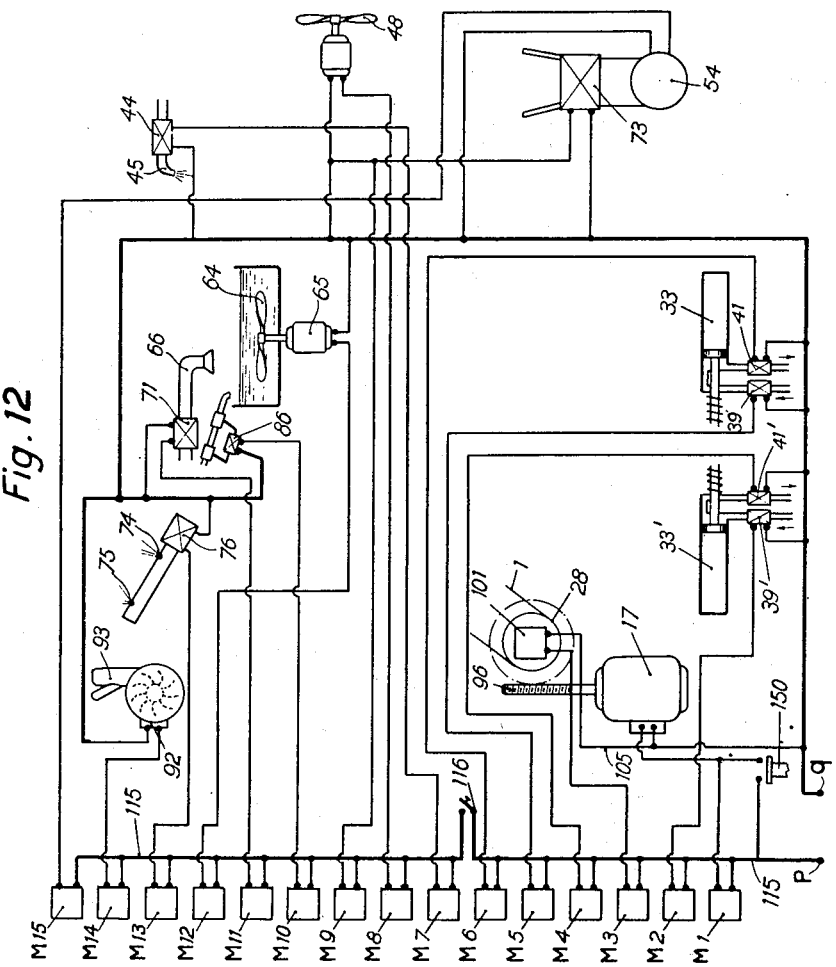
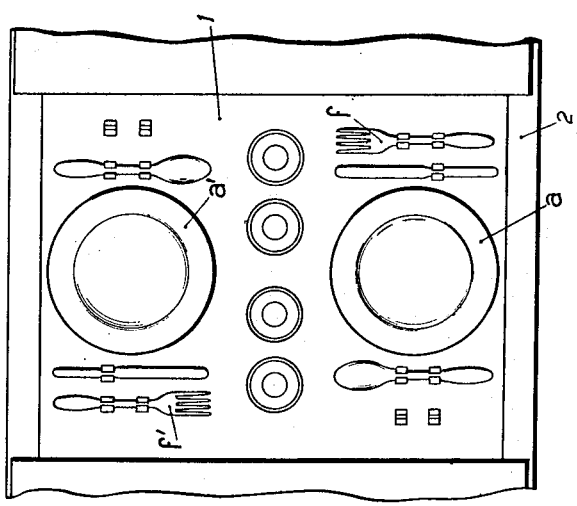
INVENTOR
BERTRAND CHÂTEL
By Linton and Linton
ATTORNEYS June 19, 1956    B. CHÂTEL    2,750,611
AUTOMATIC MEAL TABLE
Filed April 29, 1952    7 Sheets-Sheet 7
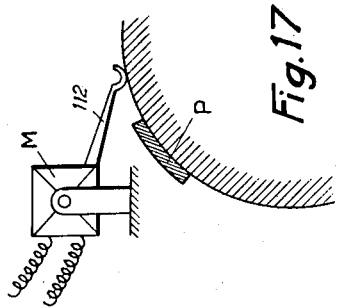
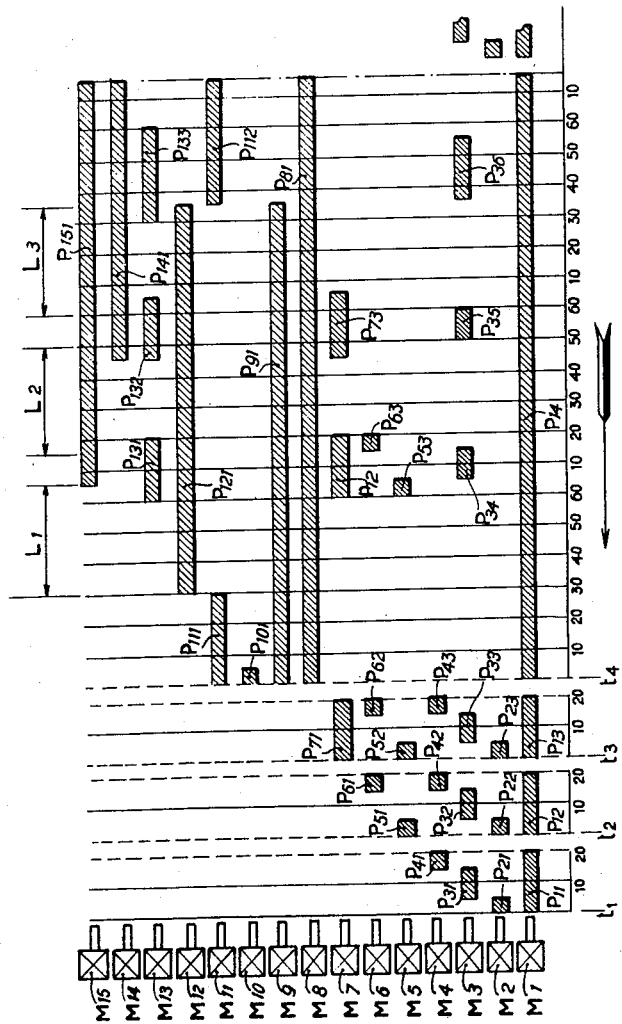
INVENTOR
BERTRAND CHÂTEL
By Linton and Linton
ATTORNEYS

# United States Patent Office 2,750,611
Patented June 19, 1956

2,750,611
AUTOMATIC MEAL TABLE

Bertrand Châtel, Paris, France

Application April 29, 1952, Serial No. 284,997

Claims priority, application France January 18, 1952

14 Claims. (Cl. 15—74)

Laying a table for a meal is a troublesome operation. This also applies to clearing the table when the meal is finished. Furthermore, between two consecutive meals, it is necessary to carry out the washing of the dirty dishes and put them away before using them for the next meal. These operations are long, disagreeable, and are really an inconvenience owing to the frequency of their repetition. Dish-washing machines have only contributed a slight improvement to this situation, for they do not eliminate any of the handling operations which precede and follow washing.

The present invention is intended to obviate these disadvantages, which have become particularly apparent in connection with the necessities of present-day living.

This invention relates to a table which automatically ensures the laying of the plates, glasses, and other dinnerware, their removal, washing and putting away. This tables comprises a belt which carries the dinnerware mechanism for driving this belt, compartments provided with cleaning devices through which the belt runs during its movements.

According to one particular arrangement of the invention, the belt carries, on at least one part of its length, groups of dinnerware placed ready for the meal, spaced out at regular intervals.

In one particular form of embodiment of the invention, the top of the table presents an opening on a level with each guest, the belt and the dinnerware which it carries appearing in each of the openings.

Preferably, the table in accordance with the invention comprises two closed spaces arranged on either side of a guest's place. These two spaces are partly occupied by the belt. Furthermore, one of them contains the various compartments for washing the dinnerware carried by the belt; the other closed space may contain the drying and polishing members and also be used for storing the dinnerware carried by the belt, as soon as they are clean.

Other characteristics connected with the present invention will be further explained during the description which follows.

One particular form of carrying out the invention is shown, by way of example, in the attached drawings, without being of any restrictive character. Explanatory diagrams of the operation of the invention or connected with particular details and alternatives, are also given.

Fig. 1 is a perspective view of a table for a guest, in accordance with the invention.

Fig. 2 is a view on a larger scale, looking down on the top of this table.

Fig. 3 is a partial section of the table, along III—III of Fig. 2, the part situated below the line X—X being an elevation view, the corresponding protection panel borne by the table being removed.

Fig. 5 is a perspective view of the underneath of one particular form of embodiment of the belt.

Fig. 6 is a section-elevation on a larger scale, of the belt and a supporting cylinder.

Fig. 7 shows a partial axial section and elevation view of the manner of fixing a plate on the table.

Fig. 8 is a perspective view of a particular removable manner of fixing a fork.

Fig. 9 is an elevation view with partial axial section showing a particular manner of fixing a glass.

Fig. 10 is a corresponding view seen from above.

Fig. 12 is a diagram of the electrical connections in a particular form of embodiment.

Fig. 13 shows a particular set of cams carried by a cylinder used for operating the mechanism.

Fig. 14 is a view seen from above, laterally cut away, of a table for two guests, in accordance with the invention.

Fig. 17 is a partial straight section of a cam-holder cylinder laid out in Fig. 13 and a contact maker.

Figure 4:
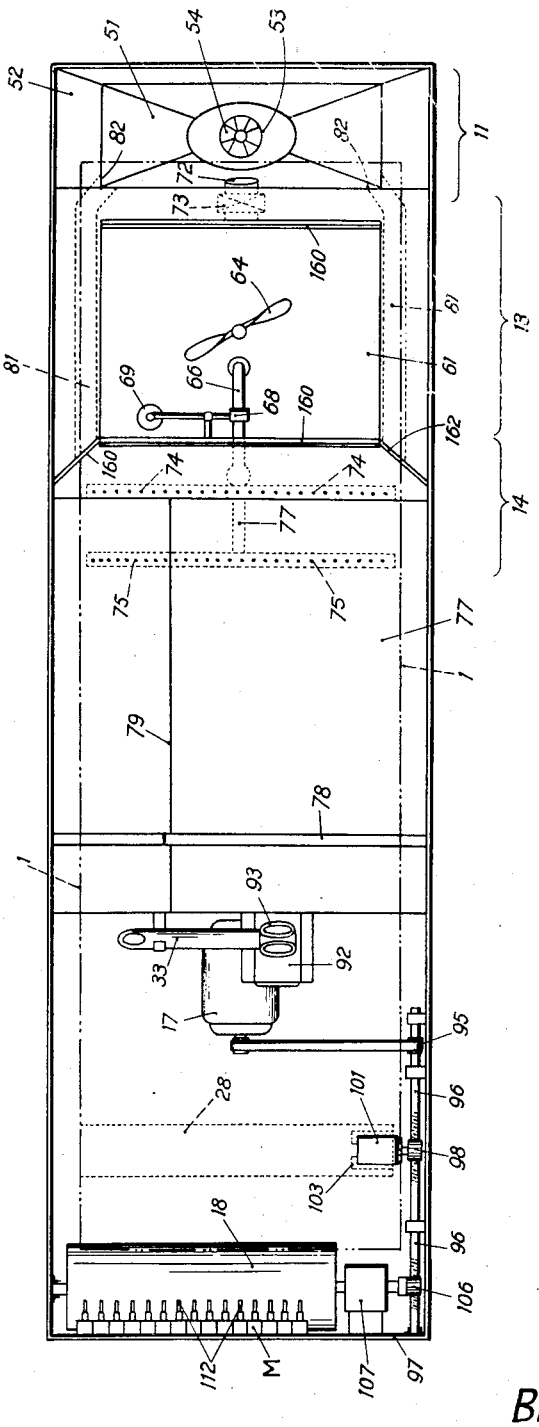
Fig. 4 is a view looking down on the interior of the table, the top and the belt being removed.

In one particular form of carrying out the invention, given solely by way of example, by referring more especially to Figs. 1 to 4, it will be seen that the table essentially comprises an endless belt 1 carrying groups of plates etc., as shown in Fig. 2.

The belt 1 is arranged according to a succession of flat sections connected together, and whose assembly constitutes an essentially polygonal outline. In its horizontal part, situated in front of the guest and above his knees when he is sitting down, the belt forms two superimposed sections 10 and 20. The top section 10 situated at the usual meal table level is on the same level as the top 2 of the table. For this purpose, the latter has a wide rectangular opening in which can be seen the belt and the dinnerware which it carries, as shown in Figs. 2 and 3.

To the right of the guest's place 3, the belt 1 forms two sloping and parallel sections 30 and 40, situated in one of the sides 4 of the table and constituting a closed space.

On the left of the place 3, the belt 1 follows a polygonal course in forming the sections 50, 60, 70, 80 and 90, situated in the other side 5 of the table which constitutes another closed space.

Only the section 10 of the whole belt is thus in the open air and accessible to the guest.

The sides 4 and 5 are preferably closed in a watertight and hermetic manner by the removable doors 6 and 6' (Fig. 1). These doors, when opened by the handles 7 and 7', enable the interior of the sides and the mechanism contained therein, to be inspected. Furthermore, two lateral drawers 8 and 8' for holding clean spare dinnerware are provided above the doors 6 and 6'.

The side 4 on the right hand of the guest, comprises a compartment 11 intended to receive solid rubbish coming from the plates and belt. This compartment is arranged appreciably in a line with the place 12 where the belt turns. The compartment 11 also receives the dirty water and liquids coming from the various stations of the table.

A compartment 13 is adjacent the compartment 11, where the belt and dishes are washed, followed by a compartment 14 where rinsing takes place. These two compartments are situated opposite the belt section 40.

The side 5 situated on the left of the guest comprises a drying compartment 15, opposite the section 50, and a polishing compartment 16 above the section 90. The side 5 also contains the driving mechanism for the belt, such as the motor 17, and the members which carry out the operation programme, such as the camholder drum 18.

The belt 1 can advantageously be constituted (Fig. 5)

by a laminated structure, made of parallel metallic battens 21, covered with a flexible and waterproof material 22 such as plastic material or rubber. Generally speaking, this material should be chosen so as to be quite capable of standing up to temperature changes, hot water, cleansing products and hot air. In the vicinity of each edge, this belt preferably comprises a link chain 23 connected to the battens 21 and turned towards the inside. These two endless chains ensure a practically constant length to the belt, no matter what strains or temperature changes are applied to it.

The belt is in contact (Fig. 6), by its internal surface, with the cylinders such as 24, fitted freely by means of the journals 25, in the frame of the table. Close to their edges, these cylinders are provided with two notches in which are mounted sprockets 26. When the belt is placed on the cylinders 24, as shown in Fig. 6, the links of chain 23 engage with the teeth of the sprockets 26.

An arrangement of this kind enables the belt to move steadily and prevents excessive strains upon it.

Furthermore, a sealing joint 19, at least in certain parts of the course is arranged between the belt 1 and the lateral walls of the table.

In the example described, the cylinders 24 can be in contact with the inside surface of the belt in a single region: cylinders $24_a$, $24_b$, or in two regions (cylinders $24_c$, $24_d$, $24_e$).

When two consecutive sections of the belt (for instance, 20 and 40), form a concave outline, the belt is kept in position by two small lateral supporting cylinders such as $27_a$ (and also $27_b$, $27_c$, $27_d$), which face each other, and arranged at the junction of the two sections. These short length cylinders are each connected to the frame by a single journal and act by bearing on the edges of the belt. The battens 21 maintain the rigidity of the belt at these points.

Figure 11:
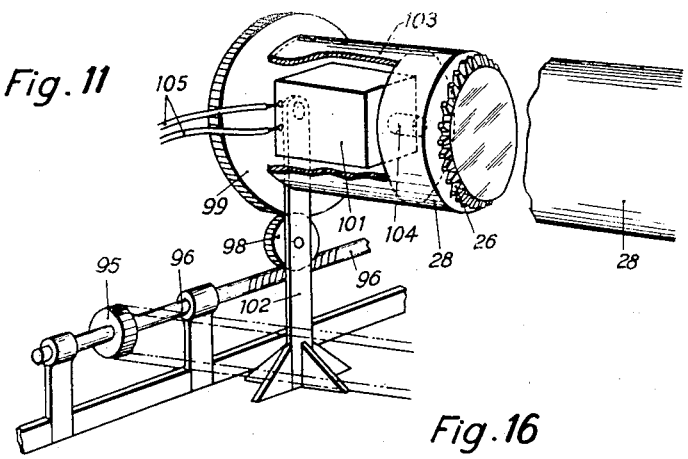
Fig. 11 is a partially cut away perspective of the device for driving the belt.

The belt drive is obtained by means of a driving cylinder 28 placed at the bottom part of the belt, and externally similar to the cylinders 24. Movement is communicated by the sprockets 26 which mesh with the links of the chain 23 (Fig. 11).

Arrangements such as that shown at 28 on the support bracket of the cylinder $24_a$, are moreover provided to keep the belt at a suitable tension.

In the example described, the belt 1 carries three groups of table fittings $S_1$, $S_2$, $S_3$ required for consuming a meal. The spacing out of the various articles of a group is governed both by the dimensions of the hollow provided in the top 1 of the table, opposite the guest (Fig. 2), and by the facility for using them during the meal. Furthermore, Fig. 2 gives an example of the lay-out of the table fittings.

These three groups of table fittings can be identical. Their reciprocal distance L measured between the centers of two consecutive plates is preferably the same.

This distance L can, for example, be appreciably equal to the length of the top section 10 of the belt.

The length of the belt is in multiples of L. In this manner, if we designate by "position A" (eating position) the middle of the section 10, we can define the positions B, C, D, E, F, and G, such as:

AB=BC=CD=DE=EF=FG=GA=L measured along the belt.

In these conditions, if the center of the plate of one of the groups of table fittings is at A (Fig. 3) the centers of the plates of the other groups will necessarily be at G and F, or at G and B, or lastly, at B and C, according as to whether the group situated at 10 is $S_1$, $S_2$ or $S_3$. This means that if the belt moves forward by a distance which is always equal to L and in an intermittent manner, the centers of the plates during meal times can thus be only at A, B, C, D, E, F or G.

The fixing of the various table fittings on the belt will be described subsequently.

The continuity between the belt 1 and the top 2 of the table is normally ensured during the meal by two covers 31 and 31' symmetrically arranged with regard to the guest's place. These covers in the closed position (right-hand cover Fig. 2 and Fig. 3) come into contact with the belt and cover the hollows provided in the top 2 to the right and left of the guest's place.

In this manner, when the covers are closed, the only part of the belt visible is the section 10 of L length.

The covers 31 and 31' are made to slide on the top 2 parallel to the large side of the table. To this end, the top 2 is provided with two groups of parallel slides 32 and 32', in which the rollers run which are fitted to the covers 31 and 31'. These covers are both connected with a hydraulic operating device constituted by a cylinder 33 or 33' housed under the top 2. Inside this cylinder there is a piston 34 (or 34') whose rod 35 (or 35') is connected to one end of the cover. A spring 36 or 36' operating under pressure is arranged around the rod 35 (or 35') between this end and the cylinder 33 (or 33').

Two conduits 37 and 38 emerge from the cylinder entry 33, each provided with an electro-valve 39 and 41. Conduits 37' and 38' with electro-valves are likewise arranged at the entry to the cylinder 35'. The conduits 37 and 37' are connected with the same conduit 42 emerging at the bottom of 4 and intended to be connected up to a feed pipe supplying cold water under pressure.

With a device of this kind, it will be easily understood that if the valve 37 is open, 41 being closed, the water thrusts the piston 34 in 33 and the cover 31 opens by sliding to the right.

If 41 is then opened and 37 is closed, the spring 36 is released drawing the piston 34 to the left which expels the water contained in the cylinder 33, through the conduit 38, and the cover 31 closes.

The conduit 42 branches out into a pipe 43, provided with an electro-valve 44, whose end 45 forms a nozzle and is directed towards the belt 1, between the position B and the region where the belt turns. The free end 46 of the conduit 38 emerges close to pipe end 45.

In the top right-hand part of the table there is also a fan whose tuyere communicates with the exterior. The purpose of this fan is to set up an air current inside the table to carry off steam and prevent the latter from condensing on the walls.

To be more precise, the compartment 11 for receiving the solid waste matter and dirty water, essentially comprises a tank 51, of a more or less pyramid shape with a rectangular base (Fig. 4). This tank is connected by flanges 52 with the walls of the table. At its lower part which is provided with a wide opening 53, is an electric crusher 54 communicating with a conduit 55 for connection to the drain.

The washing compartment 13 essentially comprises a tank 61, of appreciably prismatic shape and with a flat bottom, having in its center the screw 64 of a liquid propelling turbine driven by a motor 65. The top part of the tank 61 is parallel with the section 40 of the belt.

Over the tank 61 is a nozzle 66 connected to a general hot water intake 67 through the intermediary of a safety valve 68 controlled by a float 69 and an electro-valve 71. The nozzle 66 enables the tank 61 to be filled. The valve 68 ensures at all times the closing of 66 as soon as the water level reaches a given height. The tank 61 pours into the tank 51 through a wide conduit 72 provided with an electro-valve 73. During washing, the dinnerware are in the position C, on the section 40, appreciably in a line with the turbine 64. The compartment 13 is separated from the two adjacent compartments 11 and 14 by the flexible partitions 160, made of rubber, for example, and appreciably vertical.

The rinsing compartment 14 essentially comprises two perforated ramps 74 and 75 arranged perpendicularly to the belt and connected to the conduit 67 by the electro-valve 76.

These ramps are arranged under a sloping metallic partition 77, prolonged towards the left (Fig. 3) and terminated by a small flange 78. On the side opposite the guest this partition is provided with a part in the shape of a gutter 79, enabling the glasses to pass along when the belt is traveling. Furthermore, the ramp 75 follows this part as shown in Fig. 3.

The part 77 fitted in an appreciably horizontal manner, opposite the section 20, more particularly serves to drain the dinnerware when they are in the position D, on coming out of the rinsing section. The conduit 38', leading from the cylinder 33', and intended to evacuate the water which it contains when 41' is open, emerges at 161 in the flange 78.

All the water collected by the partition 77, is, owing to the slope of the latter, directed towards the lowest point of compartment 14, where the two lateral openings 162 are fixed. The latter communicate with two lateral discharge pipes 81, emerging at 82 in tank 51.

Between the tank 61 and the wall 83 of the side 4 a receptacle 84 containing cleansing material is housed, the bottom part of this receptacle communicating by a pipe 85 with the tank 61. This pipe 85 is provided with an assembly of two electro-valves 86 forming a lock chamber, controlled by one and the same electro-magnet, so that one is open when the other is closed. This arrangement enables a given quantity of cleansing material to be inserted.

The drying compartment 15 is arranged in the left side 5 of the table, opposite the sections 50 and 60 (position E). This compartment principally comprises a turbine 91, driven by the motor 92, and blowing air into the nozzles 93, emerging on a level with the plates and glasses situated on the belt which come opposite to them (Fig. 4). Inside the nozzles 93 heating resistances are provided such as 94.

The belt drive is ensured by the motor 17 which communicates its movement at 95 to the threaded shaft 96 which extends to the left wall 97 of the side 5. In alignment with the axis of the cylinder 28 (Fig. 11) a pinion 98 is arranged, which meshes with the shaft 96 on the one hand, and with a second pinion 99 on the other hand, of larger diameter and axial to cylinder 28.

This pinion 99 turns a shaft coming from an electro-magnetic coupling seen externally at 101 borne by the rod 102 and housed in the hollow 103 of cylinder 28. The shaft 104 coming from the coupling 101 is fixed to the drum cylinder 28. At 105 the conductors can be observed which lead in the control current to the coupling 101.

By means of this arrangement, if the coupling 101 is not operated, the rotation of the shaft and the pinions 98 and 99 do not move the cylinder 28 and consequently the belt 1 remains motionless.

If, on the other hand, the coupling is operated pinion 99 and shaft 104 become integral, the cylinder 28 revolves very slowly (owing to the large reducing gear of the system) causing the belt 1 to travel.

At the end of the shaft 96 opposite to 95, there is also a threading which meshes with a pinion 106, integral through the reducing gear 107, with the cylinder of the contact makers 18 (Fig. 4).

This cylinder thus revolves at the same speed as the shaft 96 and the motor 17. This cylinder carries a certain number of cams which are shown in the lay-out of Fig. 13. Above the cylinder 18 a row of micro-contact breakers M (Figs. 4, 12, 13 and 17) is arranged, whose contact is effected by the fingers such as 112, which rub on the surface of the cylinder 18. When the finger encounters a cam such as P, it lifts and the contact ensured by the micro-contact breaker is closed.

In the example described, the micro-contact breakers M are 15 in number and designated by $M_1$, $M_2$, $M_3$ ... $M_{15}$ (Figs. 12 and 13).

By referring more particularly to Fig. 12, it will be seen that the various electric receivers brought into action in the table in accordance with the invention (electro-valves, motors, etc.) are fed in parallel from two terminals $p$ and $q$.

In the circuit of each of these receivers, a micro-contact breaker M is inserted, one of whose poles is directly connected to $p$, by the conductor 115, and which controls the feed of the receiver in question. In the case of the electro-valves, these are supposed to be open when they are fed by the electric current. Should the feed cease, they close under the action of a counter spring.

As will be seen in Fig. 12:
$M_1$ controls the driving motor 17,
$M_2$ the electro-valve 39' for opening the cover 31',
$M_3$ the magnetic coupling 101, by the conductors 105,
$M_4$ the electro-valve 41' for closing the cover 31',
$M_5$ the electro-valve 39 for opening the cover 31,
$M_6$ the electro-valve 41 for closing this cover.

It will also be noticed that the motor 17 can be fed by this second circuit in parallel with that comprising $M_1$. This circuit comprises a contact breaker constituted by the control switch 150 placed at the guest's disposal.

Between $M_6$ and $M_7$, on the conductor 115, there is a contact breaker 116 arranged enabling all the receivers to be put out of circuit except those mentioned above, i. e., all the receivers which do not correspond to a mechanical control of the belt or covers.

In particular, these micro-contact breakers carry out the following functions:
$M_7$ control of the electro-valve 44 of the nozzle 45,
$M_8$ the motor of the fan 48,
$M_9$ the electro-valve 73,
$M_{10}$ the automatic cleansing material measurer 86,
$M_{11}$ the electro-valve 71 of the nozzle 66,
$M_{12}$ the motor 65 of the washing turbine,
$M_{13}$ the electro-valve 76 of the rinsing conduits,
$M_{14}$ the motor 92 of the hot air blower turbine 91,
$M_{15}$ the motor 54 of the crusher.

The putting into action of the various micro-contact breakers and hence the receivers which they control is governed by the arrangement of the various cams P on the cylinder 18. By altering the length of these cams, their number, or by dividing them up, the programme of the machine's working can be transformed at will.

An example of the distribution of the cams with regard to a programme which will be explained farther on, is shown in Fig. 13, where the cams $P_{11}$, $P_{12}$, $P_{13}$, $P_{14}$, control the micro-contact breaker $M_1$; $P_{21}$, $P_{22}$, $P_{23}$, for $M_2$, etc. up to $P_{151}$ for $M_{15}$.

Lastly, the side 5 contains, also facing the section 90, in the vicinity of the position G, a series of cylindrical brushes such as 121, in the polishing compartment, capable of revolving around their axis. These brushes are operated by the belts 122, driven by the pinion already mentioned, which meshes with the shaft 96.

The table which has just been described is provided for one guest, whose meal calls for three changes of dinnerware at the most. These correspond, for example, to the following courses: hors d'oeuvre, entrée, dessert, or else entrée, cheese, dessert.

For each of these courses, the correct table fittings must be automatically placed at the guest's disposal.

That is why the belt comprises three groups of equidistant table fittings: $S_1$, $S_2$ and $S_3$.

Each of these groups is preferably made up of standardized fittings, of which an example is shown in Fig. 2. It comprises: a plate $a$, a glass $v$ and a fork $f$, a knife $k$ and a spoon $c$.

The plate $a$ is provided with foot $a_1$ at its base (Fig. 7) which is appreciably truncated. It is held in place by a kind of truncated air valve which forms part of the belt 1 (Fig. 7) and gripping the foot $a_1$ whilst allowing it a certain amount of play at the bottom. In this way, the plate *a* has a certain degree of freedom which enables it to travel easily over the points where the belt has sharp curves (for example, at 12, Fig. 3).

The forks *f* and spoons *c* have—as in the ordinary manner—a relatively thin stem *t*, terminating in two bulges. The fixing device consists of two small cylinders 124 (Fig. 8) made of stainless steel, for example. These cylinders, split towards the top, have splayed flanges, as at 125, acting as a spring, whereas their base 126 is embedded in the belt. To fix the fork, it is only necessary to push the stem *t* into the cylinders 124 by pressing on the flanges 125.

This fixing device has the advantage of affording a certain amount of freedom to the table fittings. The latter thus have a slight play in their holders when the belt is traveling. Owing to this fact, the penetration of the various cleaning liquids inside the holders is ensured.

The glasses *v* (Figs. 9 and 10) also have constriction 128 at their feet. They are fastened to the belt by means of two clips 129 which are opposite each other and do not go completely round them. Each of these clips is attached to a small plate 131 embedded in the belt.

In this manner, the glasses have a certain degree of freedom upwards. To remove a glass from its holder, it only requires the guest to lift it and pull it towards him in the space comprised between the two clips. The latter open out by elasticity and the glass can be quite easily removed. An inverse operation enables the glass to be returned to its holder.

Lastly, the knives *k* can be fixed as shown in Fig. 2, in a similar manner to the forks *f*, but, for example, with a single assembly 124—125.

The operation of the table takes place in two principal stages:

1. The "meal" stage during which the guest is seated at the place 3 and controls at will the changing of table fittings, by the subsequent movements of the belt for a distance L with the group of table fittings $S_1$ being initially at the position G.

2. The "cleaning" stage, which operation is initiated by the guest and during which the table fittings and the parts of the belt utilized for the meal are automatically and successively washed, rinsed and dried. At the end of this stage, all the table fittings are clean and stored for another meal.

The combination of the "meal" and "cleaning" stages forms a cycle at the end of which all the working parts are back in their initial position. For this purpose, the gears and reducing gears 107 have been calculated so that the belt completes one revolution when all the various cams P, carried by the drum 18, have entirely passed in front of the micro-contact breakers M.

These stages are more precisely as follows:

1. *Meal stage*

In front of the guest seated at the place 3, the opening in the table top 2 is occupied by the empty belt. When the guest presses on the button 150, instant $t_1$, Fig. 12, the motor 17 begins to revolve moving the drum 18. According to the corresponding action of the various cams P on the micro-contact breakers M, the following operations take place:

The left-hand cover 31' open, then the magnetic coupling 101 is engaged and the belt 1 moves forward. The group of table fittings $S_1$ passes from the position G to the position A. At the same time the brushes 121 have been operated, polishing $S_1$. At the end of these operations the left hand cover 31 closes. The table fittings are in position for eating the first course of the meal and if the guest needs additional table fittings, he might take them from the drawers 8 or 8'. At the end of this course the guest puts the various table fittings which he has used, back in the holders 124.

When the first course has terminated, the guest presses the button 150 a second time, instant $t_2$, Fig. 13. Then the covers 31 and 31' open, the belt moves forward, $S_1$ passes to B, $S_2$ passes to A, etc. Then the belt stops and the two covers close. This operation takes place in about 20 seconds.

At the end of the second course, instant $t_3$, the guest presses again the button 150 and the same operations happen, with an additional one; that is, the nozzle 45 sprays the group $S_1$ of table fittings, doing a prerinsing of the same and doing the first washing and causes the refuse to be more easily detached therefrom as to fall by gravity into the compartment 11 when the plate turns at 12.

When the guest has finished the meal, he presses the button 150 for the fourth time and the "cleaning" stage begins.

2. *Cleaning stage*

This stage consists of two parts:

1. Putting the cleansing compartment in order from $t_4$, to $t_4+30$ seconds; the fan 48 starts, the discharge valve 73 closes, the tank 71 is filled with hot water, from nozzle 66, and cleansing material from pipe 85.

2. Cleaning operation from instant $t_4+30$ seconds to instant $t_4+3'15''$. The revolving of the turbine screw 64 throws liquid upwardly which washes the belt and table fittings at position C in 30 seconds. Then the ramps 74 and 75 discharge very hot rinsing water, and when the belt moves forward, bringing $S_1$ from C, washing, to D, draining, it provides the rinsing of $S_1$. While $S_1$ is in D, $S_2$ is cleansed at $C_1$.

At the instant $t_4+1'50''$ the belt moves again, bringing $S_1$ from D to E where it is dried by the hot air blown in by the drying fan 91.

When the washing of the last group $S_3$ has finished, instant $t_4+2'35''$, the belt effects a movement 2L, bringing $S_1$ and $S_2$ to the storing positions G and F, and $S_3$ in the drying position E. In the same time, the discharge valve 73 opens and the tank 61 is rinsed by hot water delivered by nozzle 66.

At the end of the cycle, instant $t_4+3'15''$, the various motors, including crusher 54 stop. The table is ready for another meal.

To inspect the belt or the various working parts of the table, it is possible, as an exceptional measure, to open the contact breaker 116 (Fig. 12) (which is not normally within reach of the user). By pressing the button 150 all the mechanical operations for moving the belt and covers are started up, the other working parts being at rest.

Obviously, the programme could be varied at will to a great extent, with regard to the duration and distribution of the operations, by acting on the respective arrangements and the lengths of the cams P.

It will be noticed that owing to the coupling 101 between the belt and the shaft 96 which also moves the drum 18, a perfect synchronization is obtained between the movements of the belt and those of the drum 18 and this, no matter what may be the speed of 17.

Consequently, synchronization is ensured between the movements of the belt and the various stages of the cleaning programme.

The table in accordance with the invention thus achieves in a particularly simple and automatic manner, and with great certainty in working, the operations for laying a table, clearing it, cleaning and storing the clean dishes.

The table in accordance with the invention thus finds a usefulness with private individuals or in restaurants. In the latter, it more especially enables the service to be speeded up and permits of a considerable reduction in the labor employed.

Naturally, it is possible, without going outside the scope of the invention, to apply numerous alternatives to the automatic table.

In the first place, the number of guests is obviously not limited to a single person. With the same agencies as those described above, by increasing the width of the belt 1, two places can be arranged opposite each other, as shown in Fig. 14 (plates *a* and *a'*, forks *f* and *f'*, etc.). An arrangement of this kind enables two guests facing each other to take their meal simultaneously.

By increasing the longitudinal dimensions of the hollow in the table top, and consequently the dimensions of this table top, it is possible to have a table for 4, 6, etc. guests.

On the other hand, it goes without saying that the course chosen for the polygonal outline of the belt, the distribution of the various cleaning compartments in the sides of the table, the external shape of the table, could be extensively modified with regard to the example given, either simultaneously, or independently of each other. More especially, the drying compartment could be eliminated (particularly if rinsing takes place in very hot water). The polishing compartment could also be eliminated. The internal organization of each compartment, such as that for cleansing or rinsing, can also be modified according to requirements.

It is also obvious that for controlling the covers and the various mechanical parts of the table, the covers in particular could pivot, or their drive might be electric or electro-magnetic.

The belt drive could be effected by all mechanical means equivalent to those described, and the putting into action of the various cleaning agencies could more particularly be achieved by fingers forming contactors carried by the belt.

The constitution of the belt could also be modified, as well as the number of groups of plates, etc., which it carries, the shape adopted for the latter, the number of plates, etc., placed at the guest's disposal for consuming a course, and lastly, the devices for fixing the table fitting to the belt.

Figure 16:
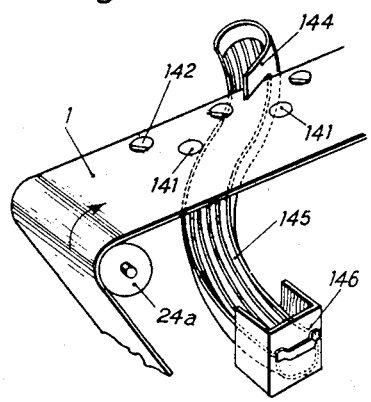
Fig. 16 is the corresponding perspective view.
Figure 15:
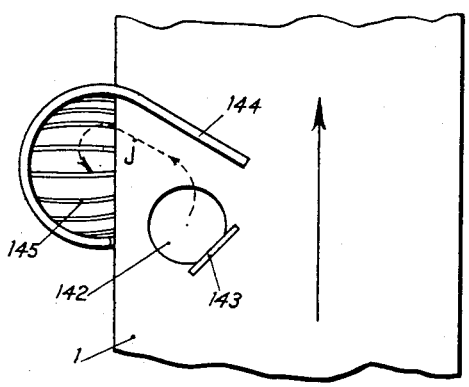
Fig. 15 is a view seen from above of an alternative manner for fixing glasses, and the automatic device for ejecting clean glasses.

More especially, the glasses could be provided with a small disk of soft iron on their bottoms, and fixed to the belt by embedded permanent magnets, such as 141 (Fig. 16). An arrangement of this kind, could more particularly enable, by the addition of a simple device shown in Figs. 15 and 16, to cause the automatic ejection and storing of some of the clean glasses, before they reach the "meal" position. To this end, in addition to the row of magnets 141 (for collecting the glasses remaining permanently on the belt) the belt comprises a parallel row of permanent magnets 142 having a small heel 143 at the rear. In front of the "meal" position, a deflector 144 is arranged in the pathway of these magnets continued by an incurved sloping trough 145, which terminates in a drawer 146 situated, for example, in the center of left side 5 of the table. The working of this device can be easily understood: when a glass comes into contact with 144, under the effect of the thrust of the heel 143 from the forward movement of the belt, it quits the holder 142 and follows the course shown by the arrows *j*, to fall into the trough 145, where it is stored at the bottom part, against 146. The design of 145 is so fixed that the glasses reach the end of their journey slowly, so that they are not broken. A device of this kind eliminates the operation by which the guest, on the arrival of a fresh group of plates, etc., takes a second clean glass which is amongst them, and places it in one of the drawers 8 or 8', so as to make a spare stock of clean glasses and be able to fix the excess dirty glasses on the belt at the end of the meal.

Lastly, it is obvious that, without going outside the scope of the invention, it is possible to add safety devices to the various working parts of the table, which would prevent any damage if, for example, certain relays cut out.

One of these devices has been described: this is the valve 68 controlled by the float 69, connected up below the electro-valve 71.

More especially, a safety device could also be provided which would prevent the belt from moving, should the covers 31 or 31' concerned not open.

What I claim is:

1. A meal table comprising a frame having a plurality of compartments and an opening in the top thereof, an endless belt, means guiding said belt for movement across said opening and through said compartments, mounting means on said belt at spaced intervals for detachably retaining dinnerware, cleaning means arranged within said compartments for cleaning dinnerware passed therethrough upon movement of said belt, means for driving said belt, means coordinated with said drive means for operating said cleaning means and manually operated means for controlling said drive means.

2. A meal table comprising a frame having a plurality of compartments, a horizontally positioned top with a rectangular opening provided therein, an endless belt, means guiding said belt for movement across said opening and through said compartments, mounting means on said belt at spaced intervals for detachably retaining dinnerware, cleaning means arranged within said compartments for cleaning dinnerware passed therethrough upon movement of said belt, means for driving said belt, means coordinated with said drive means for operating said cleaning means and manually operated means for controlling said drive means.

3. A meal table comprising a frame having a plurality of compartments, a horizontally positioned top with a rectangular opening provided therein, an endless belt having a horizontal top section with two adjacent sloping sections, said top section being positioned within said opening and on a level with the top of said frame, said sloping sections being positioned within said frame and said opening extending also over said sloping sections of said belt, means for temporarily closing said opening over said sloping sections, said means comprising two covers slidably mounted on the top of said frame, means guiding said belt for movement across said opening and through said compartments, mounting means on said belt at spaced intervals for detachably retaining dinnerware, cleaning means arranged within said compartments for cleaning dinnerware passed therethrough upon movement of said belt, means for driving said belt, means coordinated with said drive means for operating said cleaning means and said slidably fitted covers, and manually operated means for controlling said drive means.

4. A meal table comprising a frame having two lateral closets joined by an upper channel, an opening in the top of said frame, an endless belt, means guiding said belt for movement across said opening and through said lateral closets and upper channel, mounting means on said belt at spaced intervals for detachably retaining dinnerware, compartments provided in said closets through which said belt passes, cleaning means arranged within said compartments for cleaning dinnerware passed therethrough upon movement of said belt, means for driving said belt, means coordinated with said drive means for operating said cleaning means and manually operated means for controlling said drive means.

5. A meal table comprising a frame having two lateral closets joined by an upper channel, an opening in the top of said frame, an endless belt, means guiding said belt for movement across said opening and through said lateral closets and upper channel, mounting means on said belt at spaced intervals for detachably retaining dinnerware, compartments provided in said closets through which said belt passes, cleaning means comprising prerinsing means, washing means, and rinsing means arranged within said compartments for cleaning dinnerware passed therethrough upon movement of said belt, the first of said lateral closets to be penetrated by said belt during its movement comprising successively a compartment for the food remains from said dinnerware having said prerinsing means therein, a compartment with said washing means therein, and a compartment with said rinsing means therein, said frame comprising also means for driving said belt, means coordinated with said drive means for operating said cleaning means and manually operated means for controlling said drive means.

6. A meal table comprising a frame having two lateral closets joined by an upper channel, an opening in the top of said frame, and endless belt, means guiding said belt for movement across said opening and through said lateral closets and upper channel, mounting means on said belt at spaced intervals for detachably retaining dinnerware, compartments provided in said closets through which the belt passes, cleaning means comprising drying means and polishing means arranged within said compartments for cleaning dinnerware passed therethrough upon movement of said belt, the second of said lateral closets to be penetrated by the belt during its movement comprising successively a compartment for said drying means and a compartment for said polishing means, said frame comprising also means for driving said belt, means coordinated with said drive means for operating said cleaning means and manually operated means for controlling said drive means.

7. A meal table comprising a frame having two lateral closets joined by an upper channel, an opening in the top of said frame, an endless belt, means guiding said belt for movement across said opening and through said lateral closets and upper channel, mounting means on said belt at spaced intervals for detachably retaining dinnerware, compartments provided in said closets, through which said belt passes, cleaning means comprissing prerinsing means, washing means and rinsing means arranged within said compartments for cleaning dinnerware passed therethrough upon movement of said belt, the first of said lateral closets to be penetrated by said belt during its movement comprising successively a compartment for the food remains from said dinnerware with said prerinsing means positioned therein, a compartment with said washing means therein, and a compartment with said rinsing means therein, said guiding means in said first lateral closet giving the belt two parallel sections, the first one facing up and the second one facing down, the compartment for food remains being disposed adjacent the common extremity of both sections with a crusher positioned in the bottom of said compartment, said frame comprising also means for driving said belt, means coordinated with said drive means for operating said cleaning means and said crusher and manually operated means for controlling said drive means.

8. A meal table comprising a frame having two lateral closets joined by an upper channel, an opening in the top of said frame, an endless belt, means guiding said belt for movement across said opening and through said lateral closets and upper channel, mounting means on said belt at spaced intervals for detachably retaining dinnerware, compartments provided in said closets through which said belt passes, cleaning means comprising prerinsing means, washing means and rinsing means arranged within said compartments for cleaning dinnerware passed therethrough upon movement of said belt, the first of said lateral closets to be penetrated by said belt during its movement comprising successively a compartment for the food remains from said dinnerware with said prerinsing means therein, a compartment with said washing means therein, and a compartment with said rinsing means therein, said washing means comprising a tank positioned under said belt, a hot water intake, a liquid propelling turbine in said tank, a second tank of detergent material, an automatic dosing device connected to said second tank, means to direct the detergent material from said second tank to said first mentioned tank, means for driving said belt, means coordinated with said drive means for operating said cleaning means and manually operated means for controlling said drive means.

9. A meal table comprising a frame having two lateral closets joined by an upper channel, an opening in the top of said frame, an endless belt, means guiding said belt for movement across said opening and through said lateral closets and upper channel, mounting means on said belt at spaced intervals for detachably retaining dinnerware, compartments provided in said closets through which said belt passes, cleaning means comprising prerinsing means, washing means and rinsing means arranged within said compartments for cleaning dinnerware passed therethrough upon movement of said belt, the first of said lateral closets to be penetrated by said belt during its movement comprising successively a compartment for the food remains from said dinnerware and having said prerinsing means positioned therein, a compartment having said washing means positioned therein, said compartments being located at decreasing heights from the rinsing compartment to said compartment for food remains, and means for pouring into said compartment for food remains water from said other compartments, means for driving said belt mounted on said frame, means coordinated with said drive means for operating said cleaning means and manually operated means for controlling said drive means.

10. A meal table comprising a frame having two lateral closets joined by an upper channel, an opening in the top of said frame, an endless belt, means guiding said belt for movement across said opening and through said lateral closets and upper channel, mounting means on said belt at spaced intervals for detachably retaining dinnerware, compartments provided in said closets through which the belt passes, cleaning means comprising drying means and polishing means arranged within said compartments for cleaning dinnerware passed therethrough upon movement of said belt, the second of said lateral closets to be penetrated by said belt during its movement comprising successively a compartment for said drying means and a compartment for said polishing means, at least one brush rotatably mounted in said last mentioned compartment and positioned parallel to said belt, means for driving said brush, means for driving said belt mounted on said frame, means coordinated with said drive means for operating said cleaning means and manually operated means for controlling said drive means.

11. A meal table comprising a frame having a plurality of compartments and an opening in the top thereof, an endless belt, means guiding said belt for movement across said opening and through said compartments, mounting means on said belt at spaced intervals for detachably retaining dinnerware, cleaning means comprising cleaning devices arranged within said compartments for cleaning dinnerware passed therethrough upon movement of said belt, means for effecting a stepwise drive of said belt, the duration of a one-stop drive corresponding to an advancement of the belt equal in value to at least said interval between said mounting means for the dinnerware, means coordinated with said drive means for operating said cleaning means according to the stage of advancement of said belt, and manually operated means for controlling said drive means.

12. A meal table comprising a frame having a plurality of compartments and an opening in the top thereof, an endless belt, means guiding said belt for movement across said opening and through said compartments, mounting means on said belt at spaced intervals for detachably retaining dinnerware, cleaning means comprising cleaning devices arranged within said compartments for cleaning dinnerware passed therethrough upon movement of said belt, a hot water inlet connected to said frame, a cold water inlet also connected to said frame, means connecting said inlets to said cleaning devices in said compartments, at least one outlet for used water, said connecting means having pipes connected between said inlets and said cleaning devices, electrovalves connected to said pipes for controlling the same, an electric motor, means connected to said motor for driving said belt, means coordinated with said drive means for operating said cleaning means comprising a rotatably mounted cam-holder drum driven by said electric motor, electrical means for rotating said drum, cams on said drum, electrical feeding circuits connected to said electrical means, said electro-valves, said cleaning means, and said motor, switches for being operated by said cams and disposed in said feeding circuits for opening and closing the same, manually operated means mounted on said frame for controlling said drive means comprising a contact-maker for energizing said electrical means to rotate said cam-holder drum with the duration of said rotation corresponding to an advancement of the belt equal in value to at least said interval between said mounting means of dinnerware.

13. A meal table comprising a frame having a plurality of compartments and an opening in the top thereof, an endless belt, means guiding said belt for movement across said opening and through said compartments, mounting means positioned on said belt at spaced intervals for detachably retaining dinnerware, cleaning means comprising cleaning devices arranged within said compartments for cleaning dinnerware passing therethrough upon movement of said belt, a hot water inlet connected to said frame, a cold water inlet also connected to said frame, means connecting said inlets to said cleaning devices in said compartments, at least one outlet for used water, said connecting means having pipes connected between said inlets and said cleaning devices, electrovalves connected to said pipes for controlling the same, an electric motor, means connected to said motor for driving said belt, means coordinated with said drive means for operating said cleaning means comprising a cam-holder drum rotatably mounted for being driven by said electric motor, an electric coupling disposed between said motor and said belt, electrical feeding circuits connected to said electrovalves, said electric coupling and said motor, cams on said drum, switches for being operated by said cams and disposed in said feeding circuits for opening and closing the same, a manually operated contact-maker mounted on said frame for energizing said motor, and said coupling, with the duration of said energizing corresponding to an advancement of said belt equal to the interval spacing between said mounting means of dinnerware.

14. A meal table comprising a frame having a plurality of compartments and an opening in the top thereof, an endless belt, means guiding said belt for movement across said opening and through said compartments, mounting means positioned on said belt at spaced intervals for detachably retaining dinnerware, cleaning means comprising cleaning devices arranged within said compartments for cleaning dinnerware passing therethrough upon movement of said belt, a hot water inlet connected to said frame, a cold water inlet also connected to said frame, means connecting said inlets to said cleaning devices in said compartments, at least one outlet for used water, said connecting means having pipes connected between said inlets and said cleaning devices, electrovalves connected to said pipes for controlling the same, an electric motor, means connected to said motor for driving said belt, means coordinated with said drive means for operating said cleaning means comprising a rotatably mounted cam-holder drum, means for rotating said cam-holder drum in synchronism with the drive of said belt, cams being mounted on said drum according to a program of operation, comprising two parts, the first part corresponding to the meal and comprising the advancement of the belt a value equal to said interval spacing between said mounting means of dinnerware each time said contact-maker is switched on with said part of the program occurring until said contact-maker has been switched on a number of times corresponding to the number of groups of mounting means, and the second part of said program corresponding to the cleaning, and comprising the continuous advancement of the belt and the correlative operation of the cleaning devices with said part of the program occurring when said contact-maker has been switched on a supplementary time.

References Cited in the file of this patent

UNITED STATES PATENTS

| | | |
|---|---|---|
| 1,053,607 | Johnston | Feb. 18, 1913 |
| 1,373,506 | Hoyt | Apr. 5, 1921 |
| 1,375,144 | Frantz | Apr. 19, 1921 |
| 1,583,034 | Valerios et al. | May 4, 1926 |
| 1,748,530 | Torres | Feb. 25, 1930 |
| 1,798,183 | Voshardt | Mar. 31, 1931 |
| 1,846,703 | Wiener | Feb. 23, 1932 |
| 1,952,568 | Schapp et al. | Mar. 27, 1934 |
| 2,502,265 | Macon | Mar. 28, 1950 |